United States Patent
Del Vescovo et al.

(10) Patent No.: US 9,810,233 B2
(45) Date of Patent: Nov. 7, 2017

(54) SEALING ARRANGEMENT FOR AXIALLY SPLIT TURBOMACHINES

(71) Applicant: Nuovo Pignone Srl, Florence (IT)

(72) Inventors: Carlo Del Vescovo, Florence (IT); Donato Antonio Rip, Florence (IT); Fabrizio Milone, Florence (IT)

(73) Assignee: Nuovo Pignone Srl, Florence (IT)

( * ) Notice: Subject to any disclaimer, the term of this patent is extended or adjusted under 35 U.S.C. 154(b) by 319 days.

(21) Appl. No.: 14/653,943

(22) PCT Filed: Dec. 17, 2013

(86) PCT No.: PCT/EP2013/076805
§ 371 (c)(1),
(2) Date: Jun. 19, 2015

(87) PCT Pub. No.: WO2014/095787
PCT Pub. Date: Jun. 26, 2014

(65) Prior Publication Data
US 2015/0345503 A1     Dec. 3, 2015

(30) Foreign Application Priority Data

Dec. 21, 2012   (IT) ................................. FI2012A0289

(51) Int. Cl.
*F04D 29/12* (2006.01)
*F04D 1/06* (2006.01)
(Continued)

(52) U.S. Cl.
CPC ........... *F04D 29/12* (2013.01); *F01D 25/243* (2013.01); *F02C 7/28* (2013.01); *F04D 1/06* (2013.01);
(Continued)

(58) Field of Classification Search
CPC . F01D 25/243; F02C 7/28; F04D 1/06; F04D 17/12; F04D 29/12; F04D 29/043;
(Continued)

(56) References Cited

U.S. PATENT DOCUMENTS 4,474,007 A * 10/1984 Kronogard .............. F02B 37/00
 417/407
4,541,786 A *  9/1985 McLean .................. F01D 5/284
 384/527

(Continued)

FOREIGN PATENT DOCUMENTS

CN      201925218 U    8/2011
DE    102009053102 A1   5/2011
(Continued)

OTHER PUBLICATIONS

Unofficial English translation of Office Action and Search Report issued in connection with corresponding CN Application No. 201380073635.8 on Mar. 24, 2016.
(Continued)

*Primary Examiner* — Igor Kershteyn
(74) *Attorney, Agent, or Firm* — GE Global Patent Operation

(57) ABSTRACT

An axially-split turbomachine comprising a casing comprised of a first casing portion and a second casing portion, forming a housing for a rotor arranged for rotation therein. The rotor comprises a shaft and at least one impeller mounted on the shaft. The casing comprises at least one shaft passageway through which the shaft extends from the interior of the casing towards the exterior of the casing. The sealing arrangement comprises a linear sealing member, extending between the first and the second casing portions. The sealing arrangement further comprises at least one sealing ring portion surrounding said at least one shaft
(Continued)

passageway. The sealing ring portion and the linear sealing member form a continuous sealing body.

20 Claims, 3 Drawing Sheets

(51) Int. Cl.
F04D 17/12 (2006.01)
F04D 29/043 (2006.01)
F04D 29/053 (2006.01)
F04D 29/22 (2006.01)
F04D 29/28 (2006.01)
F04D 29/42 (2006.01)
F04D 29/62 (2006.01)
F01D 25/24 (2006.01)
F02C 7/28 (2006.01)
F04D 29/08 (2006.01)

(52) U.S. Cl.
CPC .......... *F04D 17/12* (2013.01); *F04D 29/043* (2013.01); *F04D 29/053* (2013.01); *F04D 29/22* (2013.01); *F04D 29/28* (2013.01); *F04D 29/426* (2013.01); *F04D 29/4206* (2013.01); *F04D 29/62* (2013.01); *F04D 29/086* (2013.01); *F05D 2240/55* (2013.01)

(58) Field of Classification Search
CPC .... F04D 29/4206; F04D 29/426; F04D 29/62; F04D 29/22; F04D 29/28; F04D 29/053; F04D 29/086; F05D 2240/55
See application file for complete search history.

(56) References Cited

U.S. PATENT DOCUMENTS

| | | | | |
|---|---|---|---|---|
| 4,786,238 A | * | 11/1988 | Glaser | F01D 25/125 415/175 |
| 5,310,311 A | * | 5/1994 | Andres | B64D 13/06 310/90.5 |
| 6,354,083 B1 | * | 3/2002 | Shuttleworth | F01D 25/125 60/597 |
| 6,425,743 B1 | * | 7/2002 | Fischer | F02C 1/00 415/174.2 |
| 2006/0263208 A1 | | 11/2006 | Stone et al. | |
| 2012/0257966 A1 | * | 10/2012 | Boening | F01D 25/162 415/229 |
| 2012/0269620 A1 | * | 10/2012 | Boening | F01D 25/24 415/203 |
| 2012/0269624 A1 | * | 10/2012 | Boening | F01D 25/168 415/229 |
| 2012/0321455 A1 | * | 12/2012 | Boening | F01D 25/14 415/208.1 |

FOREIGN PATENT DOCUMENTS

JP 2010255568 A 11/2010
WO 2012117016 A1 9/2012

OTHER PUBLICATIONS

International Search Report and Written Opinion dated Apr. 23, 2014 which was issued in connection with PCT Patent Application No. PCT/EP2013/076805 which was filed on Dec. 17, 2013.

IT Search Report dated Sep. 2, 2013 which was issued in connection with IT Patent Application No. FI2012A000289 which was filed on Dec. 21, 2012.

* cited by examiner

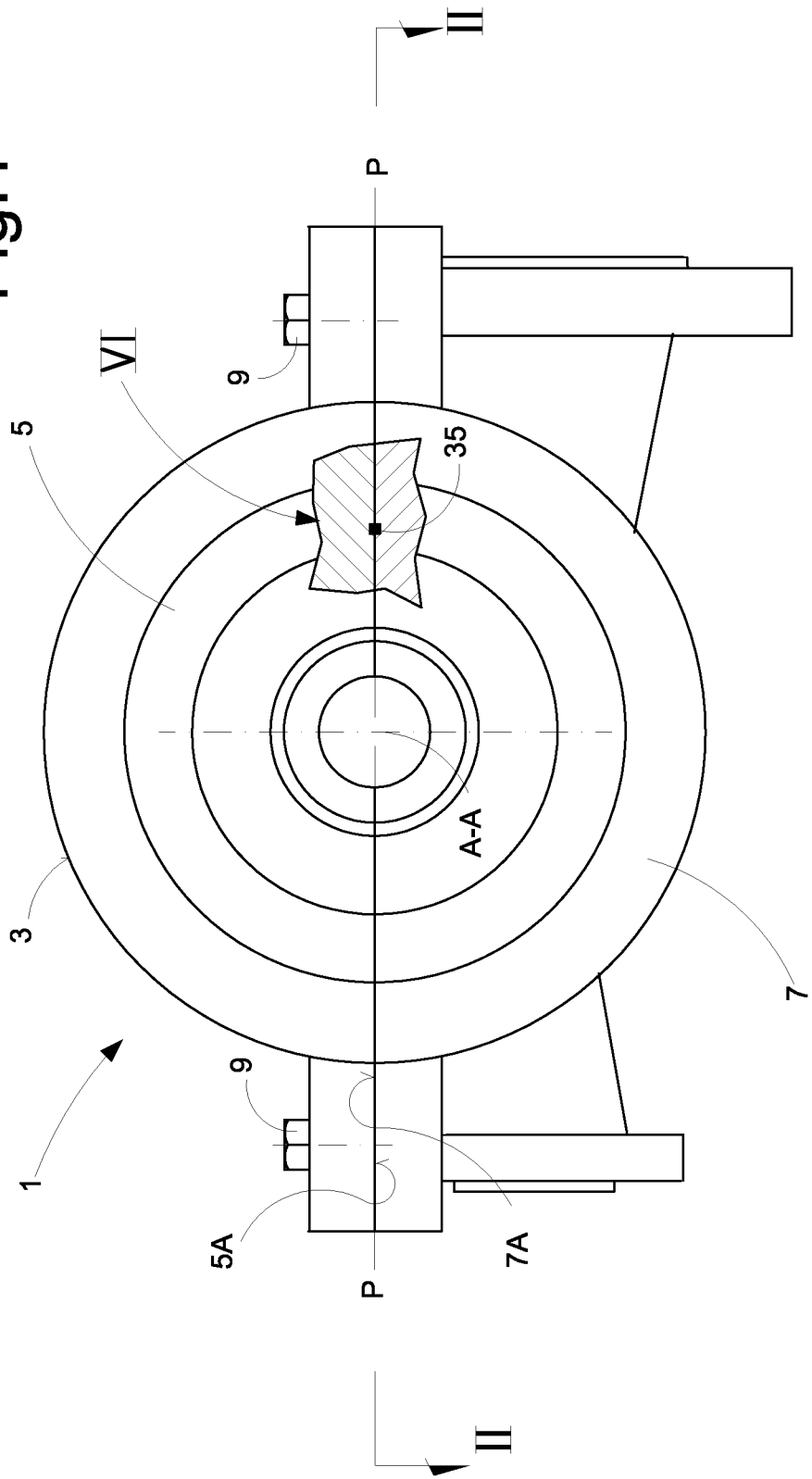

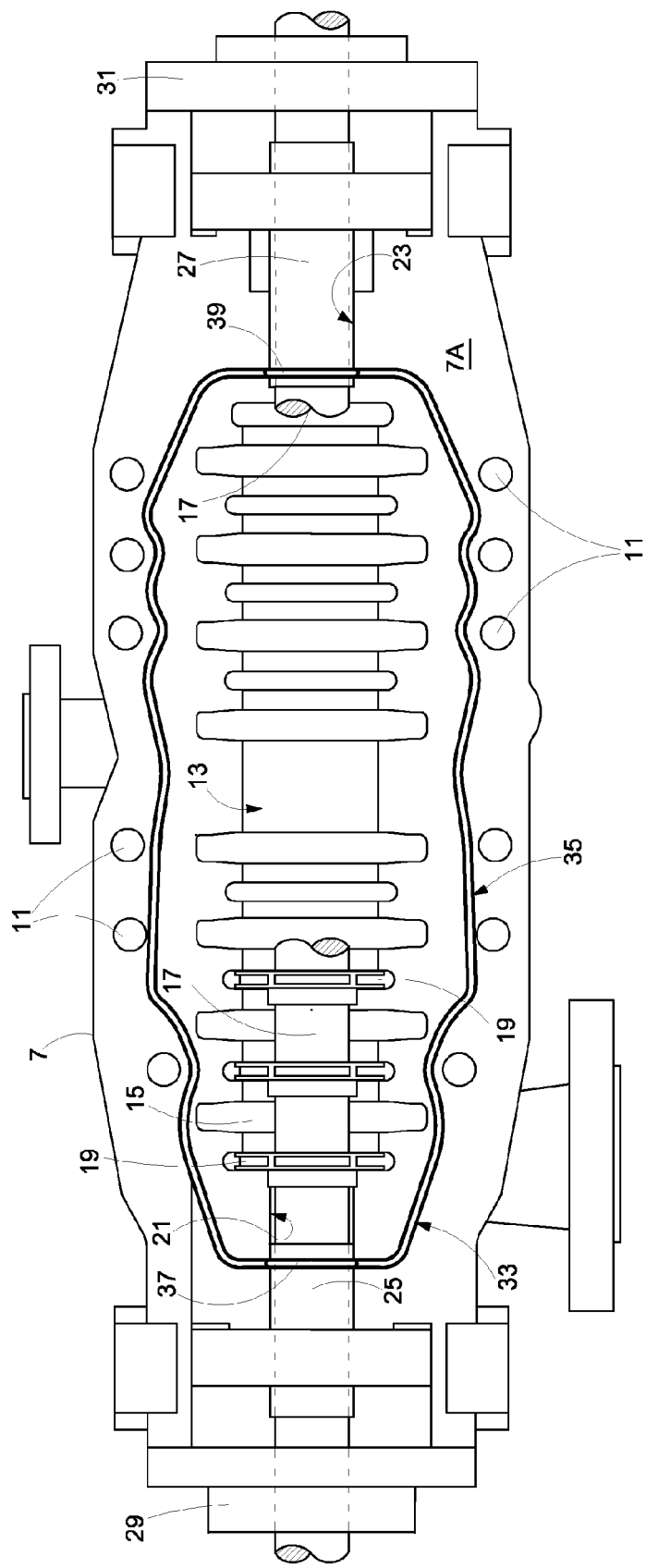

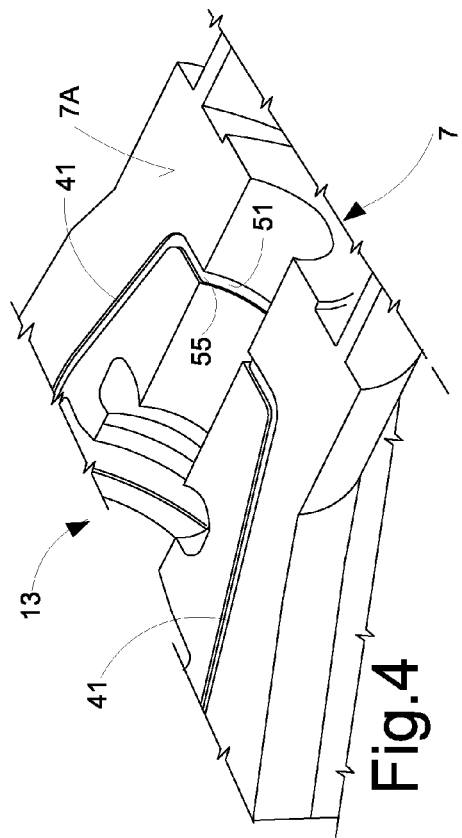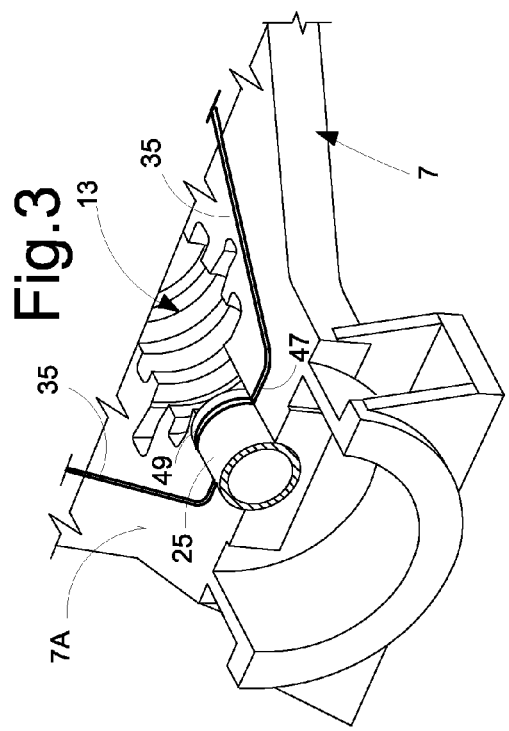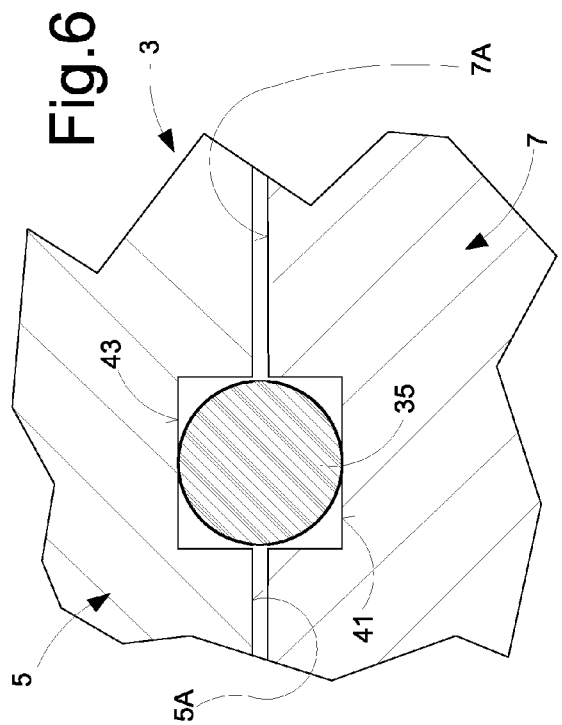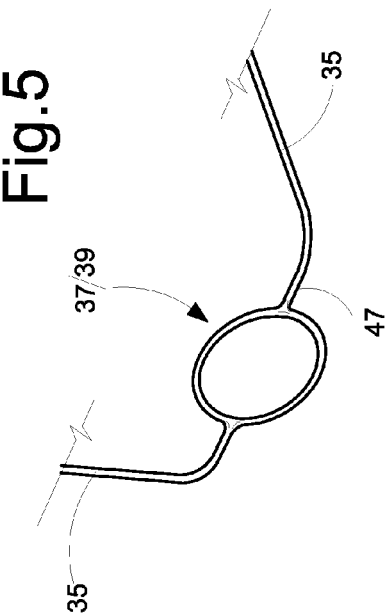

SEALING ARRANGEMENT FOR AXIALLY SPLIT TURBOMACHINES

BACKGROUND

The disclosure refers to turbomachines, and more specifically to axially split turbomachines. Embodiments of the present disclosure specifically refer to sealing arrangements for axially split turbomachines, such as for instance multi-stage centrifugal pumps.

Turbomachines usually comprise an external casing forming a housing wherein a rotor is arranged. The rotor comprises a shaft and one or more impellers keyed on the shaft for rotation therewith. Depending upon the design of the turbomachine, the casing can be vertically split or horizontally split. A horizontally split turbomachine, also named axially split turbomachine, is one wherein the casing is divided into two casing portions along a plane containing the axis of rotation of the rotor. The two casing portions have mutually facing contact surfaces. A sealing arrangement is provided between the opposite contact surfaces. The two casing portions are bolted together by means of bolt-and-nut arrangements. The closure force generates a contact pressure between the contact surfaces and the sealing arrangement.

Sealing arrangements currently used in horizontally split or axially split machine casings include sheets, e.g. made of plastic material, positioned between the contact surfaces of the two casing portions. The bolts, which connect the two casing portions, pre-load the sheet establishing a contact pressure between the surfaces of the sheet and each one of the two contacting surfaces of the opposing casing portions. The contact pressure must be sufficiently high to avoid leakages between the casing portions. A large number of bolts is required, which must be designed and positioned so as to generate a sufficiently high contact pressure between the relatively extensive contacting surfaces.

Sealing sheets are subject to deformation due to the high pressure of the fluid being processed by the turbomachine. The inner edge of the plastic sheet, i.e. the edge facing the rotor housing, is subject to compressive stresses in the plane where the sheet lies. Moreover, the distribution of the contact pressure is uncertain and depends upon many factors. Efficiency of the sealing arrangement is unpredictable and the design process is extremely complex, as the pressure area is dependent upon the strain of the bolts and upon relaxation of the plastic sheet.

There is therefore a need for a more efficient sealing arrangement for axially split turbomachines.

SUMMARY OF THE INVENTION

According to the disclosure, a sealing arrangement is provided, which entirely surrounds the rotary components of the turbomachine forming a continuous seal having a substantially linear development. The sealing arrangement separates the interior of the turbomachine from the environment entirely surrounding the pressure area of the turbomachine. The bolts or tie rods which connect the axially-split housing of the turbomachine are located outside the area surrounded by the sealing arrangement, and are thus not classified as "wetted parts".

In some embodiments an axially split turbomachine is provided, comprising a casing comprised of a first casing and a second casing portions connected to one another, e.g. by means of bolts or tie-rods. The first and second casing portions are comprised of a first contact surface and a second contact surface, respectively, between which the sealing arrangement is arranged. The first and second casing portions enclose a housing where a rotor is rotatingly arranged. The rotor generally comprises a shaft and at least one impeller mounted on said shaft and integrally rotating therewith. At least one shaft passageway is further provided through the casing. The shaft extends through the passageway for connection to a prime mover, e.g. an electric motor or a turbine engine. The sealing arrangement comprises a linear sealing member, extending between the mutually opposing first contact surface and the second contact surface of the first and second casing portions. In an embodiment, the sealing arrangement further comprises at least one sealing ring portion surrounding the shaft passageway. The sealing ring portion and the linear sealing member form a continuous sealing body. For example the sealing ring portion and the linear sealing member can be formed as a monolithic member, e.g. a component molded as a single element in a single mold. In other embodiments the sealing ring portion and the linear sealing member can be made of several parts which are manufactured separately and subsequently connected together, e.g. by welding, gluing, or in any other suitable manner.

The sealing arrangement entirely surrounds the interior of the turbomachine, i.e. the pressure area thereof. If the turbomachine is a pump, for instance, the sealing arrangement surrounds the shaft around the through passageway, through which the shaft exits the casing, as well as the volutes and the impeller camber(s) where the one or more impellers of the pump are arranged.

In a manner known per se, the two casing portions can be tightened to one another by means of a plurality of bolts. In an embodiment, the linear sealing member is arranged between the rotor and the bolts, so that the bolts are entirely outside the wet area.

As commonly provided in known turbomachines, a mechanical seal sleeve can be arranged in said at least one shaft passageway. The shaft extends through the mechanical seal sleeve. In an embodiment, the sealing ring portion in this case arranged around the mechanical seal sleeve, between the mechanical seal sleeve and the two casing portions. The mechanical seal sleeve can comprise an external annular groove, partly housing the sealing ring portion.

In some embodiments the turbomachine can comprise two shaft passageways extending through the machine casing and arranged at opposite ends of said casing. Two opposing end portions of the shaft extend through the two shaft passageways. In some embodiments, a respective mechanical seal sleeve can be arranged in each shaft passageway, between the casing and the shaft. In an embodiment, the sealing arrangement comprises two sealing ring portions, each being arranged around a respective one of the two mechanical seal sleeves. The two sealing ring portions are connected to the linear sealing member, forming a continuous sealing arrangement therewith, said continuous sealing arrangement surrounding the rotor and the two mechanical seal sleeves. The two sealing ring portions and the linear sealing member can be made as a monolithic component or formed by assembling together two or more parts, e.g. by gluing or welding. The linear sealing member is comprised of two parts, between which the two sealing ring portions are located. In an embodiment, the two parts forming the linear sealing member are connected with the two sealing ring portions at a T-joint, thus resulting in a continuous sealing member.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 1 illustrates a schematic front view of a centrifugal pump;

FIG. 2 illustrates a sectional view according to II-II of FIG. 1, with portion removed;

FIG. 3 illustrates an enlargement of one of the shaft passageways provided in the casing of the pump of FIGS. 1 and 2;

FIG. 4 illustrates an enlarged perspective view of the shaft passageway with the mechanical seal sleeve removed;

FIG. 5 illustrates a perspective view of a portion of the sealing arrangement according to one embodiment of the present disclosure;

FIG. 6 illustrates an enlarged schematic cross section of the linear sealing member arranged between the two contact surfaces of the casing portions.

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

As will become apparent from the following detailed description of embodiments of the subject matter to which the present disclosure refers, an axially-split turbomachine is provided, comprising a casing comprised of a first casing portion and a second casing portion, forming a housing for a rotor arranged for rotation therein. The rotor comprises a shaft and at least one impeller mounted on the shaft. The casing comprises at least one shaft passageway, through which the shaft extends from the interior of the casing towards the exterior of the casing. The sealing arrangement comprises a linear sealing member, extending between the first and the second casing portions. The sealing arrangement further comprises at least one sealing ring portion surrounding said at least one shaft passageway. The sealing ring portion and the linear sealing member form a continuous sealing body.

FIG. 1 illustrates a schematic front view of a centrifugal pump 1. The centrifugal pump comprises a casing 3 having a first casing portion 5 and a second casing portion 7. The two casing portions 5 and 7 match along an axial plane P-P, containing the rotation axis A-A of the rotor of the pump 1.

Each casing portion 5, 7 comprises a respective contact surface. Reference number 5A designates the contact surface of the first casing portion 5 and reference number 7A indicates the contact surface of the second casing portion 7.

The two casing portions 5 and 7 are connected to one another by means of a plurality of bolts 9 and nuts. The bolts 9 are pre-loaded and generate a contact pressure between the two contact surfaces 5A, 7A and a sealing arrangement provided there between. The sealing arrangement will be described in greater detail later on.

The bolts 9 extend through holes 11 (see FIG. 2) provided in the two casing portions 5 and 7. The bolts 9 and respective holes 11 are distributed on both sides of a rotor housing 13 formed by the two casing portions 5, 7. The rotor housing 13 houses a rotor 15. In some embodiments, the rotor 15 comprises a shaft 17 and a plurality of impellers 19 keyed on the shaft 17 and rotating therewith.

According to some embodiments, both opposite terminal or end portions of the shaft 17 extend through respective first and second passageways 21, 23 formed in the casing.

Mechanical seal sleeves 25 and 27 are arranged in the two passageways 21 and 23. The terminal shaft portions extend through the respective mechanical seal sleeves and are supported by respective bearings 29, 31 arranged in opposite end portions of the casing 3.

A sealing arrangement labeled 33 as a whole is arranged between the two opposite contact surfaces 7A, 5A of the two casing portions 7 and 5. The sealing arrangement 33 can be comprised of a first linear sealing member 35 and two sealing ring portions 37, 39.

In some embodiments the linear sealing member 35 has a circular cross-section. In other embodiments the linear sealing member can have an elliptical cross-section. In yet further embodiments the linear sealing member can have a polygonal cross-section.

The ring sealing portions 37, 39 can have a cross section similar to or identical to the cross section of the linear sealing member 35.

The linear sealing member 35 can be comprised of two linear sealing portions provided on opposite sides of the rotor housing 13. Each linear sealing portion extends between the rotor housing 13 and the bolts 9 and respective holes 11. The two sealing ring portions are arranged between the two linear sealing portions of the linear sealing member and form a continuous sealing arrangement therewith.

The linear sealing member 35 fluidly separates the rotor housing 13 from the bolts 9 preventing leakage from the interior of the pump towards the bolts.

In some embodiments the two contact surfaces 5A, 7A can be planar and the linear sealing member 35 can be simply placed between the two facing planar surfaces 5A, 7A. In other embodiments at least one of the two opposing contact surfaces 5A, 7A can be provided with a linear groove at least partly housing the linear sealing member 35. As shown particularly in FIG. 4, in this embodiment the contact surface 7A formed by the second casing portion 7 is provided with a groove 41 extending between the rotor housing 13 and the holes 11 through which the bolts 9 extend. The linear sealing member 35 is partly housed in the groove 41.

A similar groove can be provided on the opposing contact surface 5A.

The enlargement of FIG. 6 illustrates a local cross-section according to a plane orthogonal to the planar contact surfaces 5A, 7A. FIG. 6 illustrates the groove 41 provided in the contact surface 7A and an opposing groove 43 provided in the contact surface 5A. As can be appreciated from FIG. 6, in this embodiment the linear sealing member 35 has a substantially circular cross-section. The diameter of the linear sealing member 35 and the depth of the two grooves 41, 43 are dimensioned so that when the casing portions are placed one on top of the other, the bolts 9 are tightened, the two casing portions 5, 7 are in contact with one another along the contact surfaces 5A, 7A and/or the linear sealing member 35 is compressed therebetween. By tightening the bolts, the linear sealing member 35 will be compressed and elastically deformed in the seat formed by the grooves 41, 43. A high contact pressure will be established between the linear sealing member 35 and the surfaces of grooves 41, 43. Since the surface of contact between the sealing member 35 and the casings portions 5, 7 is small, a high contact pressure between the sealing member 35 and the casing portions can be achieved with a small tensile stress along the bolts 9.

In other embodiments a groove can be provided only in one of the two opposing contact surfaces 5A, 7A, the other one of the two surfaces being planar. In yet further embodiments, both contact surfaces 5A, 7A can be planar, and the linear sealing member 35 can be positioned there between. Using a groove 41 or 43 or both makes positioning of the sealing arrangement and assembling the turbomachine casing easier.

As can best be seen in FIG. 2, the linear sealing member 35 forms a single body with the two sealing ring portions 37, 39 surrounding the mechanical seal sleeves 25 and 27.

The enlargement of FIG. 5 shows one of the two sealing ring portions 37, 39 and the connection thereof with the adjacent portions of the linear sealing member 35. The components 35, 37/39 are joined at respective T-shaped joints shown at 47.

Each sealing ring portion 37, 39 surrounds the respective mechanical seal sleeves 25 and 27 and is arranged between the respective mechanical seal sleeve and the inner surface of the respective passageway 21, 23, formed by the two casing portions 5 and 7.

In some embodiments the outer surface of the mechanical seal sleeve 25, 27 can be provided with an annular groove 49 (see FIG. 3). The sealing ring portion 37/39 is partly housed in the respective annular groove 49 of the corresponding mechanical seal sleeve 25, 27.

In some embodiments the groove 49 can be omitted. In this case the sealing ring portion 37, 39 will simply be mounted on the cylindrical outer surface of the respective mechanical seal sleeve.

In some embodiments the inner surfaces of the two casing portions 5 and 7 forming the respective passageways 21 and 23 can be provide with respective semi-annular grooves 51 (see FIG. 4). The sealing ring portions 37, 39 are in this case partly housed in the annular groove which is formed by the two semi-annular grooves 51 upon mounting of the two casing portions 5 and 7 one on top of the other. In other embodiments, the inner surface of the passageway 21, 23 can be smooth, i.e. devoid of the semi-annular grooves 51. In this case the sealing ring portion 37, 39 will be simply mounted in contact with the cylindrical surface of the passageway.

When one, the other or both the annular and semi-annular grooves 49, 51 are provided, the depth of the grooves and the cross-sectional dimensions of the sealing ring portions 37, 39 are selected so that the sealing ring portions 37, 39 are squeezed and compressed upon locking of the bolts 9, thus providing a sealing effect around the mechanical seal sleeve 25, 27. A concentrated contact pressure is generated on the limited surface of contact between the two sealing ring portions 37, 39 and the mechanical components in contact therewith, namely the outer surface of the mechanical seal sleeves 25, 27 and the inner surface of the passageways 21, 23.

As can best be appreciated from FIG. 4, the semi-annular grooves 41 (if present) are aligned with the corresponding grooves 41 and 43 provided on the contact surfaces 7A, 5A respectively. To prevent damages of the sealing arrangements at the joining area where the linear sealing member 35 is connected to the respective sealing ring portion 35, 37, the grooves 41, 43 and the semi-annular grooves 51 of the passageways are joined to one another along a rounded edge 55, thus avoiding damages and scraps of the sealing member during case assembling In some embodiments the two sealing portions 37, 39 can be manufactured separately from the two portions of the linear sealing member 35. The four components, namely the two portions of the linear sealing member 35 and the two sealing ring portions 37, 39 can be connected to one another in a subsequent manufacturing step, for example by gluing, welding, or in any other suitable manner. This greatly simplifies the manufacturing process and prevents the need for a complex mold, which would be required for manufacturing the sealing arrangement 35, 37, 39 as a single monolithic component. This option, however, is not excluded.

The sealing arrangement 35, 37, 39 provides a continuous sealing around the entire inner housing 13 of the centrifugal pump. The linear sealing member 35 provides a radial sealing between the bolts 9 and the inner housing 13 where the rotor 15 is arranged, the linear sealing member 35 developing between the holes 11 through which the bolts 9 extend and the volutes formed in the casing 3. The two sealing portions 37, 39 provide an axial sealing effect at the opposing ends of the shaft 17, around the mechanical seal sleeves 25, 27.

The small surface of contact between the sealing arrangement and the mechanical parts of the turbomachine results in a limited pre-load required to achieve a sufficient and reliable sealing.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. An axially-split turbomachine comprising:
a casing comprising a first casing portion with a first contact surface and a second casing portion with a second contact surface;
a sealing arrangement between the first casing portion and the second casing portion;
a rotor arranged for rotation in the casing, the rotor comprising a shaft and at least one impeller mounted on the shaft; and
at least one shaft passageway through the casing, the shaft extending through the shaft passageway,
wherein the sealing arrangement comprises:
a linear sealing member, extending between the first contact surface and the second contact surface, and
at least one sealing ring portion surrounding the at least one shaft passageway,
wherein the at least one sealing ring portion and the linear sealing member form a continuous sealing body.

2. The turbomachine of claim 1, further comprising a plurality of bolts connecting the first casing portion and the second casing portion to one another, wherein the linear sealing member is arranged between the rotor and the bolts.

3. The turbomachine of claim 1, further comprising at least one mechanical seal sleeve arranged in the at least one shaft passageway, the shaft extending through the mechanical seal sleeve, wherein the sealing ring portion is arranged around the mechanical seal sleeve.

4. The turbomachine of claim 3, wherein the mechanical seal sleeve comprises an external annular groove, partly housing the sealing ring portion.

5. The turbomachine of claim 3, wherein:
the casing further comprises two shaft passageways, arranged at opposite ends of the casing, two end portions of the shaft extending through the two shaft passageways,
a mechanical seal sleeve is arranged in each shaft passageway, between the casing and the shaft,
the sealing arrangement comprises two sealing ring portions, each being arranged around a respective one of the mechanical seal sleeves, and
the sealing ring portions are connected to the linear sealing member, forming a continuous sealing arrangement therewith, the continuous sealing arrangement surrounding the rotor and the two mechanical seal sleeves.

6. The turbomachine of claim 1, wherein the linear sealing member comprises two linear sealing portions connected to one another by at least one the sealing ring portion.

7. The turbomachine of claim 5, wherein each sealing ring portion is connected to the linear sealing member by respective T joints.

8. The turbomachine of claim 5, wherein each mechanical seal sleeve comprises an external annular groove, partly housing the respective sealing ring portion.

9. The turbomachine of claim 1, wherein:
at least one of the first contact surface and the second contact surface comprises a groove, and
the linear sealing member is partially housed in the groove.

10. The turbomachine of claim 1, wherein both the first contact surface and the second contact surface are provided with respective grooves, and the linear sealing member is at least partly housed in the grooves.

11. The turbomachine of claim 1, wherein the at least one shaft passageway comprises an annular groove, the at least one sealing ring portion being at least partly housed in the annular groove.

12. The turbomachine of claim 5, wherein each shaft passageway comprises a respective annular groove, and wherein the sealing ring portions are at least partly housed in the respective annular grooves.

13. The turbomachine of claim 2, further comprising at least one mechanical seal sleeve arranged in the at least one shaft passageway, the shaft extending through the mechanical seal sleeve, wherein the sealing ring portion is arranged around the mechanical seal sleeve.

14. The turbomachine of claim 13, wherein the mechanical seal sleeve comprises an external annular groove, partly housing the sealing ring portion.

15. The turbomachine of claim 14, wherein:
the casing further comprises two shaft passageways, arranged at opposite ends of the casing, two end portions of the shaft extending through the two shaft passageways,
a mechanical seal sleeve is arranged in each shaft passageway, between the casing and the shaft,
the sealing arrangement comprises two sealing ring portions, each being arranged around a respective one of the mechanical seal sleeves, and
the sealing ring portions are connected to the linear sealing member, forming a continuous sealing arrangement therewith, the continuous sealing arrangement surrounding the rotor and the two mechanical seal sleeves.

16. The turbomachine of claim 4, wherein:
the casing further comprises two shaft passageways, arranged at opposite ends of the casing, two end portions of the shaft extending through the two shaft passageways,
a mechanical seal sleeve is arranged in each shaft passageway, between the casing and the shaft,
the sealing arrangement comprises two sealing ring portions, each being arranged around a respective one of the mechanical seal sleeves, and
the sealing ring portions are connected to the linear sealing member, forming a continuous sealing arrangement therewith, the continuous sealing arrangement surrounding the rotor and the two mechanical seal sleeves.

17. The turbomachine of claim 6, wherein each sealing ring portion is connected to the linear sealing member by respective T joints.

18. The turbomachine of claim 6, wherein each mechanical seal sleeve comprises an external annular groove, partly housing the respective sealing ring portion.

19. The turbomachine of claim 7, wherein each mechanical seal sleeve comprises an external annular groove, partly housing the respective sealing ring portion.

20. The turbomachine of claim 6, wherein each shaft passageway comprises a respective annular groove, and wherein the sealing ring portions are at least partly housed in the respective annular grooves.

* * * * *